United States Patent [19]
Bresolin et al.

[11] Patent Number: 5,474,674
[45] Date of Patent: Dec. 12, 1995

[54] EXTERNAL FILTRATION DEVICE PARTICULARLY FOR AQUARIUMS AND ORNAMENTAL WATER TANKS

[75] Inventors: Valerio Bresolin; Samuele Lolato, both of Pove Del Grappa, Italy

[73] Assignee: Hydor S.r.l., Bassano Del Grappa, Italy

[21] Appl. No.: 221,055

[22] Filed: Mar. 30, 1994

[30] Foreign Application Priority Data

Apr. 7, 1993 [IT] Italy ................... VI93A0052

[51] Int. Cl.$^6$ .................................................. A01K 63/04
[52] U.S. Cl. .................. 210/169; 210/232; 210/244; 210/416.2
[58] Field of Search ............... 210/416.2, 416.1, 210/169, 244, 232, 433.1; 417/234, 435, 424.1

[56] References Cited

U.S. PATENT DOCUMENTS

| | | | |
|---|---|---|---|
| 3,685,919 | 8/1972 | Speck et al. | 210/416.2 |
| 4,290,883 | 9/1981 | Sama | 210/169 |
| 4,643,652 | 2/1987 | Eberhardt | 417/435 |
| 4,789,467 | 12/1988 | Lindsay et al. | 210/103 |
| 4,805,798 | 2/1989 | Stolzman | 220/315 |
| 4,934,914 | 6/1990 | Kobayashi et al. | 417/435 |
| 4,999,109 | 3/1991 | Sabre | 210/244 |
| 5,277,800 | 1/1994 | Dieckmann et al. | 210/416.2 |
| 5,283,915 | 2/1994 | Idland et al. | 417/423.14 |
| 5,294,335 | 3/1994 | Chiang | 210/416.2 |
| 5,316,670 | 5/1994 | Yao | 210/169 |

*Primary Examiner*—Peter A. Hruskoci
*Assistant Examiner*—Theodore M. Green
*Attorney, Agent, or Firm*—R. Neil Sudol; Henry D. Coleman

[57] ABSTRACT

The invention relates to an external filtration device, particularly for aquariums and ornamental water tanks, which includes a container formed by a lower hollow part (2) that is closed at the top by a detachable lid (3) and internally accommodates a filtration chamber (6) and a pump (11) which are connected to the outside by an inlet connector (8) and an outlet connector (15). A priming suction chamber (18) is located upstream of the pressure chamber (12) of the pump (11) and downstream of the filtration chamber (6). The suction chamber (18) has a removable upper plug (25) and is connected to the pressure chamber (12) of the pump (11) by an horizontal passage (20) and to the filtration chamber (6) by a vertical duct (22). A discharge chamber (26) is located directly downstream of the pressure chamber (12) and is directly connected to the outlet connector (15). Safety hooks (27) engage the lid with the lower hollow part (2).

17 Claims, 3 Drawing Sheets

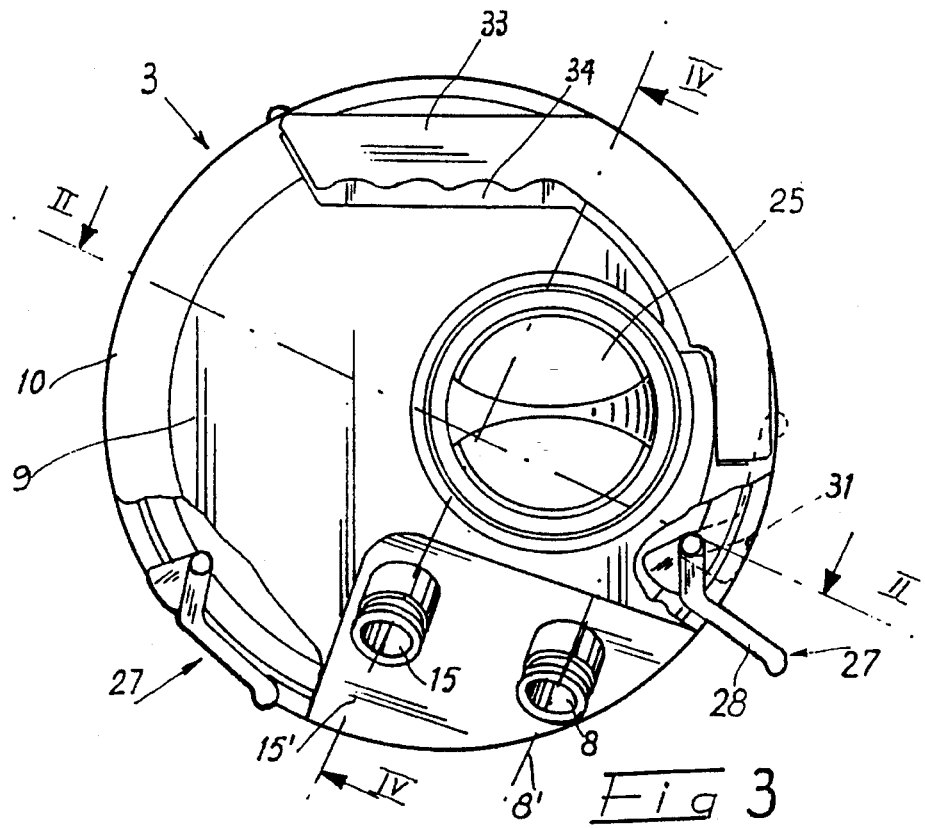
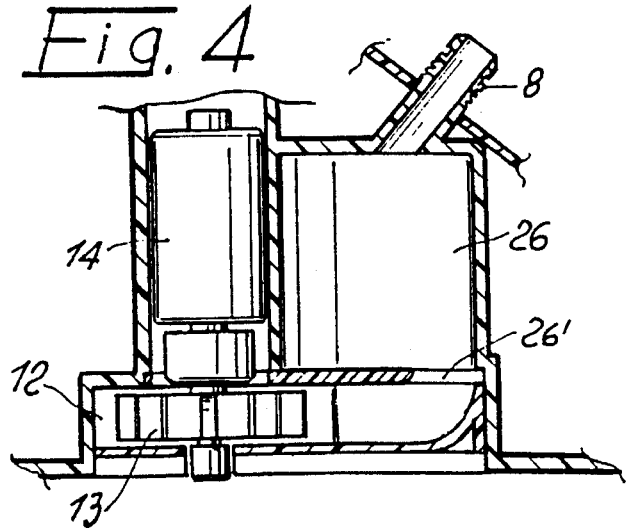
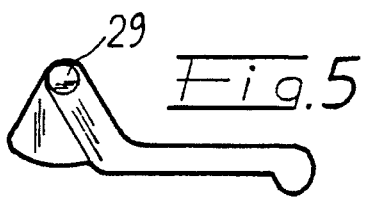
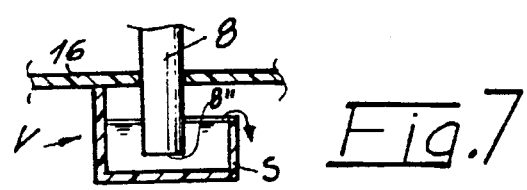
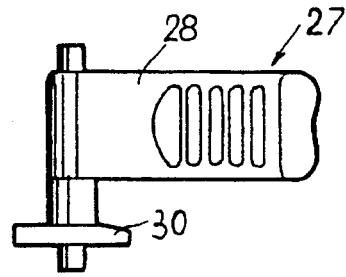

EXTERNAL FILTRATION DEVICE PARTICULARLY FOR AQUARIUMS AND ORNAMENTAL WATER TANKS

BACKGROUND OF THE INVENTION

1. Field of the Invention

The present invention relates to an external filtration device particularly for aquariums and ornamental water tanks, of the type including a hermetically closed container that internally accommodates a pump and a filtration chamber which are connected to the outside by a suction connector and a discharge connector.

2. Description of the Prior Art

As is known, in devices of the above indicated type the suction and discharge connectors are generally connected to the tank of the liquid to be filtered by virtue of ordinary flexible hoses.

These devices should open in order to allow periodic maintenance of the filter. Accordingly, such devices are generally composed of two parts that can be coupled hermetically by locking hooks or other manual closure devices.

In some known devices, the container is formed by a lower cup-shaped part adapted to receive a filter cartridge and by an upper part or lid that encloses an electric pump together with the suction and discharge connectors. The pump can be arranged upstream or downstream of the filter component.

In order to ensure pump startup, the pump must be primed by keeping the impeller constantly submerged, avoiding if possible the forming of air pockets in the ducts.

In a known device provided with an upstream pump, the pump is located at the base of the container. This arrangement facilitates the priming of the pump but causes unfiltered liquid to flow through some of its internal components, with consequent greater wear and risk of seizing. Furthermore, the pump can be rather noisy, especially after an initial period of use.

In another conventional device the pump is arranged downstream of the filtration component, for example built into the lid, and in order to prime the pump it is necessary to first of all fill the container with liquid and expel the air from the circuit.

Both arrangements have drawbacks that compromise the durability and efficiency of the pump or the practicality and functionality of the device as a whole.

An additional drawback of conventional external filtration devices arises from the components for closing the container, which are generally constituted by lever-like hooks. These components are in fact difficult to operate and do not have an easily identifiable open or closed position. This can cause unintentional opening of the device and therefore accidental leakage of the liquid contained in the device, consequently forcing one to repeat the pump priming operations.

The aim of the invention is to eliminate the drawbacks described above by providing an external filtration device, particularly for aquariums and ornamental water tanks in general, that can be easily primed from the outside without complicated and troublesome operations.

An object is to provide an external filtration device that can be opened easily for inspection and maintenance and unequivocally visualizes its open or closed condition, so as to avoid accidental opening on the part of the user.

SUMMARY OF THE INVENTION

The invention achieves this aim and this object by virtue of an external filtration device, as defined in the introduction, characterized in that the pump has a pressure chamber that has a priming means which can be accessed directly from outside.

In this manner the pump startup operations become easier and more straightforward, without having to resort to troublesome operations or having to disassemble the device.

Preferably, the priming means includes at least one suction chamber located downstream of the filtration chamber and upstream of the pressure chamber of the pump.

The suction chamber can be accessed from outside by virtue of a hermetic plug that can be opened, and is connected to the pressure chamber of the pump by a substantially horizontal passage and to the filtration chamber by a substantially vertical duct that runs within the suction chamber to a level that is higher than the pressure chamber of the pump.

There is also a discharge chamber which is located directly downstream of the pressure chamber of the pump and is connected directly to the outlet connector.

The container is closed in its upper region by a lid that internally accommodates the suction and the discharge chambers, the pump, and the inlet and outlet connectors.

The top cover or lid has, along its peripheral region, a plurality of hook members for engaging the upper part of the lower element of the container and provided with an opening preventing closure means.

Further characteristics and advantages will become apparent from the detailed description of a preferred but not exclusive embodiment of the filtration device according to the invention, given by way of non-limitative example with the aid of the accompanying drawings.

BRIEF DESCRIPTION OF THE DRAWINGS

FIG. 3 is a partially cutout top view of the device of FIG. 1, illustrating the engagement means;

FIG. 4 is a sectional view of a detail of FIG. 3, taken along the plane IV—IV;

FIG. 5 is a top view of a detail of the engagement system of the device of FIG. 1;

FIG. 6 is a side view of the detail of FIG. 5;

FIG. 7 is an enlarged-scale view of a detail of FIG. 2.

DESCRIPTION OF THE PREFERRED EMBODIMENTS OF THE INVENTION

Figure 1:
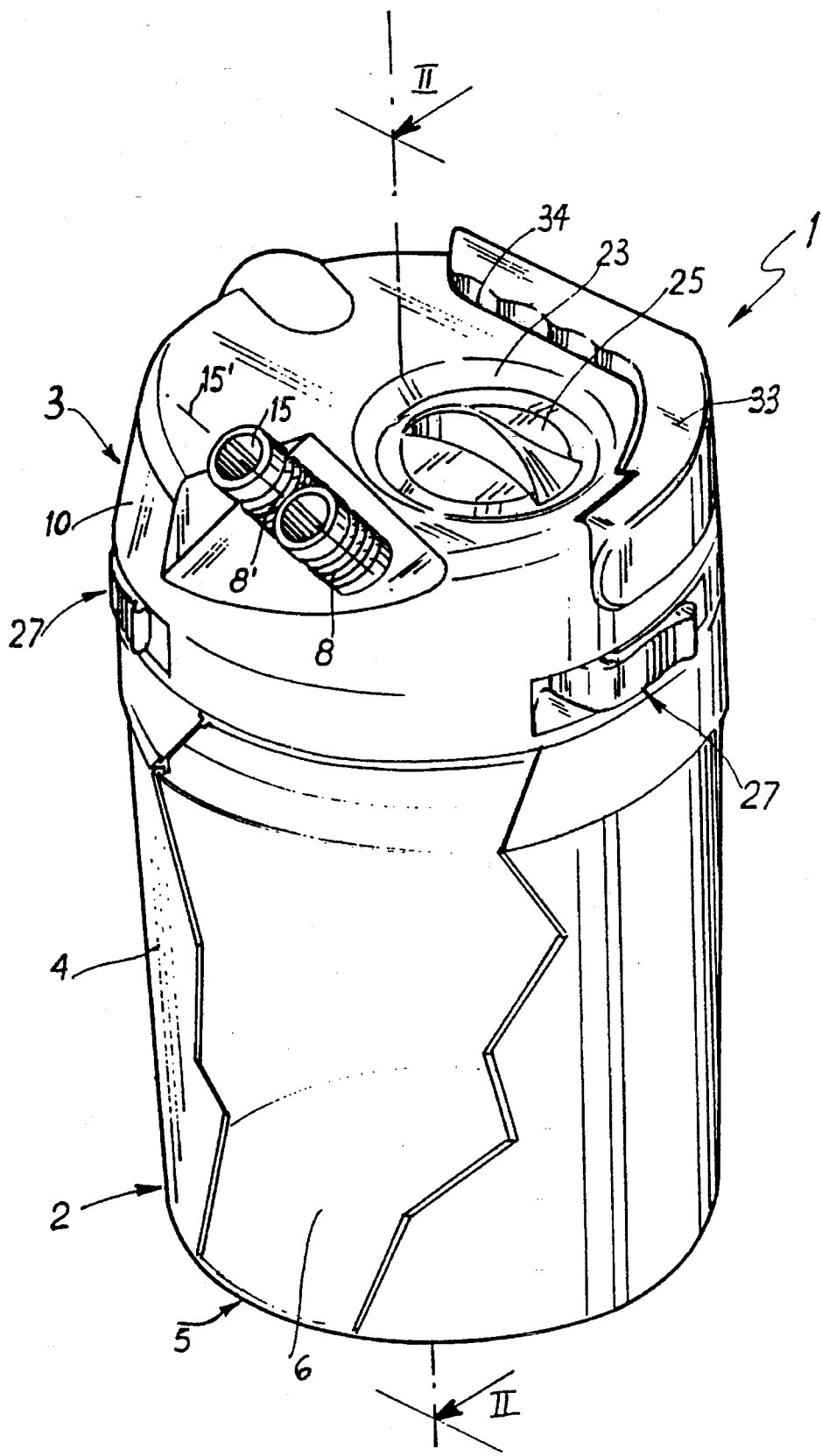
FIG. 1 is a partially cutout perspective view of a filtration device according to the invention.

With reference to the above figures, an external filtration device according to the invention is shown and generally designated by the reference numeral 1. The device includes a container formed by a hollow lower part 2 which is generally cup-shaped and is closed at its top by a lid 3.

The hollow part 2 has an outer side wall 4 which may be generally cylindrical, or having the shape of a truncated cone, and is closed at its bottom by a base 5. The base 5 is substantially flat and also acts as resting base for the container. The hollow part 2 forms a filtration chamber 6 which is suitable to accommodate a filtration cartridge 7 that has slightly smaller dimensions, so as to form an interspace for the flow of the fluid to be filtered. The filtration cartridge 7 can have a differentiated structure, for example with a core made of granular material surrounded by layers of fibrous materials, in order to retain solid particles of increasingly small diameter from the bottom toward the top and from the outside inward.

The filtration chamber 6 is connected to the outside by a fluid suction inlet 8 which passes through the lid 3 and protrudes from its upper wall.

The lid 3 includes an outer container which is generally cup-shaped, has an upper wall 9 and a side wall 10, and internally accommodates a pump 11. The pump is formed by a pressure chamber 12 that accommodates an impeller 13 which is driven by an electric motor 14, for example of the synchronous type.

The lid 3 can have a substantially flat lower wall 16 that expands to form a funnel-shaped conveyor 17. This conveyor is hermetically fitted on the filtration cartridge 7 when the lid 3 is closed over the hollow part 2.

According to the invention, the pressure chamber 12 has a priming means that can be easily accessed from the outside. This priming means can be formed by a suction chamber 18 which is located downstream of the filtration chamber 6 and upstream of the pressure chamber 12 of the pump.

Preferably, the suction chamber 18 is formed by a hollow cylindrical part 19 which is inserted in the container 9 and is superimposed on the lower wall 16 of the lid 3. The suction chamber 18 communicates with to the pressure chamber 12 which accommodates the impeller 13 of the pump 11 via a substantially horizontal lower passage 20 that runs up to the inlet 21 of the chamber 12.

A substantially vertical duct 22 also runs from the lower wall 16 and is located inside the suction chamber 18 so that its upper end is at a higher level than the pressure chamber 12. The duct 22 communicates in a lower region with the funnel-shaped manifold 17 and thus with the filtration chamber 6 formed inside the hollow part 2. The cylindrical side wall 19 of the suction chamber 18 is connected to the upper wall 9 of the lid 3 at a flared opening 23 and has an internally threaded upper edge 24 in which a plug 25, with a sealing ring 25, is screwed.

In this manner, the pressure chamber 12 can be filled by unscrewing the plug 25 and filling the suction chamber 18 with liquid up to a certain level, which is indicated by a level line and is in any case lower than the maximum height of the duct 22, By virtue of the principle of communicating vessels the impeller 13 is completely immersed and allows the priming of the pump 11 after closing the plug 25.

Preferably, the inlet connector 8 and the outlet connector 15 are formed monolithically on the upper wall 9 of the lid 3 and have respective axes 8' and 15' which are slightly tilted with respect to the vertical so as to facilitate connections to external ducts not shown in the drawings.

According to another aspect of the invention, the priming means furthermore includes a discharge chamber 26 which is located downstream of the pressure chamber 12 and is connected to it through the opening 26'. The outlet connector 15 is fitted directly on the discharge chamber.

The discharge chamber 26, which is for example cylindrical in a position that is adjacent to the motor 14, acts as a siphon in the discharge circuit and prevents the water column that is present in the external outlet duct from forming air pockets that would prevent the priming of the pump every time it stops.

Conveniently, the volume of the discharge chamber 26 is greater than, or equal to, the volume of the suction chamber 18 in order to ensure the perfect operation of the filtration device every time it is started, by virtue of the siphon effect.

Figure 2:
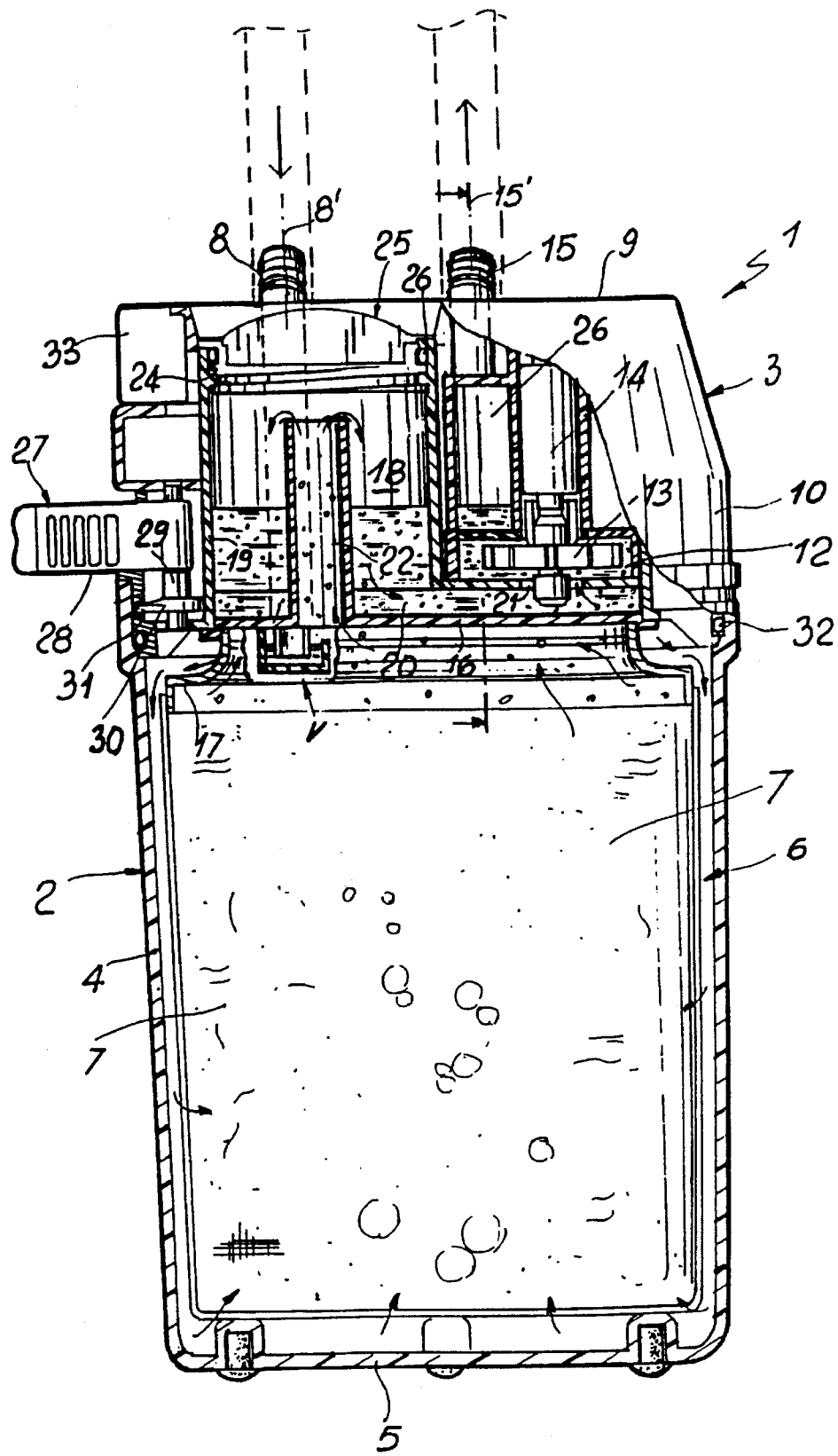
FIG. 2 is a sectional and partially cutout front view of the device of FIG. 1, taken along the vertical plane II—II of FIG. 1.

In order to further increase the reliability of the priming means on the suction side, it is possible to provide a labyrinth valve V shown in reduced scale in FIG. 2 and in enlarged scale in FIG. 7. This valve is formed by a tray S which is rigidly coupled to the lower wall 16 of the lid 3, and the lower end 8" of the inlet connector 8 leads into this tray.

In this manner, any air present in the filtration chamber cannot rise along the connector 8 and cannot produce interruptions or air pockets in this portion of the circuit.

According to another aspect of the invention, the lid 3 of the device 1 can be coupled to the lower part 2 of the container by at least two, preferably three, lever hooks 27 which are arranged along the lower edge of the side wall 10 in angularly equidistant positions.

Each hook 27 is formed by an arm 28 which is mounted on a substantially vertical pivot 29 which is parallel to the main axis of the device 1. Each pivot has an eccentric protrusion 30 that is suitable to fit, by rotating through approximately 90°, in a complementarily shaped seat 31 of the lower part 2 of the container. The seat 31 is constituted for example by a circular groove formed in the inner upper edge of the wall 4.

The position of the eccentric protrusions 30 is such that in closed position each arm 28 is aligned with the outer surface of the container, whereas in open position it protrudes radially outward, clearly indicating this condition to the user.

For the sake of completeness in description, it is noted that it is possible to form, along the respective coupling edges of the container 2 and of the lid 3, facing circular seats for accommodating an elastic gasket 32 that ensures the tightness of the device during operation.

It is also possible to provide a supporting handle 33, shaped approximately as an arc, which can be rotated and inserted so as to fit flush in an appropriate seat 34 of the lid 3.

Both the cup-like part 2 and the lid 3 can be generally made of identical or different plastic materials according to the specific requirements, by injection-molding or by any other known forming processes.

In use, in order to perform the first activation of the device after appropriately connecting it to an electric power source and to the suction and discharge ducts of the tank, the plug 25 of the suction chamber 18 is opened, and the suction chamber is filled with liquid up to the preset level and then closed hermetically. When the pump is started, the liquid poured earlier into the suction chamber 18 is drawn by the pump 11 along the passage 20, drawing more liquid from the filtration chamber 6. The drawn liquid can rise along the vertical duct 22 after passing through the filtration cartridge 7 and the manifold 17.

The liquid collected in the suction chamber 18 passes through the horizontal passage 20 and is fed into the pressure chamber 12 of the pump 11, and fills the discharge chamber 26, which acts as a siphon and from which it is ejected through the outlet connector 15.

The presence of the suction and discharge chambers and of the labyrinth valve V ensures optimum conditions for quick and safe priming both during initial startup and during subsequent startup operations.

The filtration device according to the invention is susceptible of numerous modifications and variations, all of which are within the scope of the inventive concept expressed by the accompanying claims. All the details may be replaced with technically equivalent ones. The materials, the shapes and the dimensions may be any according to the situations.

We claim:

1. An external filtration device, for cleaning water of aquariums and ornamental tanks, comprising:

a lower cup-shaped element defining a filtration chamber;

a filtration member disposed in said filtration chamber;

an upper cover element;

means for detachably coupling said cover element to said cup-shaped element;

an inlet connector on said cover element, said inlet connector projecting generally upwardly from said cover element;

an outlet connector on said cover element, said outlet connector projecting generally upwardly from said cover element;

pumping means in at least one of said cup-shaped element and said cover element for driving liquid to be cleaned from said inlet connector through said filter member to said outlet connector, said pumping means having a pressure chamber;

priming means disposed in said cover element for priming said pumping means; and access means on said cover element for enabling direct access to said priming means from outside the filtration device while maintaining said cover element attached to said cup-shaped element via said means for detachably coupling.

2. Filtration device according to claim 1, wherein said priming means comprises at least one suction chamber located upstream of said pressure chamber of said pumping means and downstream of said filtration chamber.

3. Filtration device according to claim 2, wherein said access means includes a removable plug for enabling access to said suction chamber.

4. Filtration device according to claim 3, wherein said suction chamber communicates with said pressure chamber of said pumping means by a substantially horizontal passage and to said filtration chamber by a substantially vertical duct.

5. Filtration device according to claim 4, wherein said substantially vertical duct runs inside said suction chamber up to a higher level than said pressure chamber of said pumping means.

6. Filtration device according to claim 2, wherein a discharge chamber is arranged directly downstream of said pressure chamber and is directly connected to said outlet connector.

7. Filtration device according to claim 2, wherein a discharge chamber is arranged directly downstream of said pressure chamber and is directly connected to said outlet connector, said discharge chamber communicating with said pressure chamber by an opening and having a volume that is at least as great as a volume of the suction chamber.

8. Filtration device according to claim 2, wherein a discharge chamber is arranged directly downstream of said pressure chamber and is directly connected to said outlet connector, said suction chamber, said discharge chamber, and said pumping means being accommodated inside said cover element.

9. Filtration device according to claim 1, wherein a labyrinth valve is interposed between said inlet connector and said filtration chamber for preventing a reverse flow of air along said inlet connector.

10. Filtration device according to claim 1, wherein said inlet connector and said outlet connector have end portions that protrude from an upper wall of said cover element and have slightly tilted axes with respect to a vertical direction to facilitate connection to respective external ducts.

11. Filtration device according to claim 1, wherein said means for detachably coupling includes at least one closure member on one of said cup-shaped element and said cover element, said closure member having a closure position in which said cup-shaped element and said cover element are coupled to one another and an opening position in which said cup-shaped element and said cover element may be detached from one another, said closure position and said opening position being sufficiently different to enable a determination, by simple visual inspection, as to a status of coupling of said cup-shaped element and said cover element.

12. Filtration device according to claim 11, wherein said means for detachably coupling comprises at least two lever hooks having arms pivoted on a lower rim of said cover element by virtue of substantially vertical pivots, said closure member being one of said arms.

13. Filtration device according to claim 11, wherein said means for detachably coupling comprises at least two lever hooks having arms pivoted on a lower rim of said cover element by virtue of substantially vertical pivots, said closure member being one of said arms, said pivots having eccentric parts suitable to engage in complimentarily shaped seats formed along an inner upper edge of said lower cup-shaped element.

14. Filtration device according to claim 11, wherein said means for detachably coupling comprises at least two lever hooks having arms pivoted on a lower rim of said cover element by virtue of substantially vertical pivots, said closure member being one of said arms, said lever hooks being arranged along a circumferential extension of said cover element in angularly equidistant positions.

15. Filtration device according to claim 11, wherein said means for detachably coupling comprises at least two lever hooks having arms pivoted on a lower rim of said cover element by virtue of substantially vertical pivots, said closure member being one of said arms, said lever hooks being arranged along a circumferential extension of said cover element in angularly equidistant positions, said closure member being preset to rotate between said closure position, which is substantially parallel to an outer surface of said cover element, and said opening position which protrudes radially outwardly with respect to said cover element.

16. An external filtration device, for cleaning water of aquariums and ornamental tanks, comprising:

a lower cup-shaped element defining a filtration chamber;

a filtration member disposed in said filtration chamber;

an upper cover element;

means for detachably coupling said cover element to said cup-shaped element;

an inlet on said cover element;

an outlet on said cover element;

pumping means in said cover element for driving liquid to be cleaned from said inlet through said filter member to said outlet, said pumping means having a pressure chamber;

priming means disposed in said cover element for priming said pumping means, said priming means including a suction chamber disposed downstream of said filtration chamber and upstream of said pressure chamber, said suction chamber communicating with said pressure chamber via a passage, said suction chamber communicating with said filtration chamber via a duct having an outlet end disposed higher than said pressure chamber and said passage; and means for defining a discharge chamber communicating with said pressure chamber and said outlet and disposed downstream of said pressure chamber, said discharge chamber having a volume at least as great as a volume of said suction chamber.

17. Filtration device according to claim 16, wherein said duct is substantially vertical and said passage is substantially horizontal.

* * * * *